US011396376B1

(12) United States Patent
Carnegie

(10) Patent No.: US 11,396,376 B1
(45) Date of Patent: Jul. 26, 2022

(54) Y-SHAPED AIRLINER AND ASSOCIATED METHODS

(71) Applicant: Cameron Carnegie, Merritt Island, FL (US)

(72) Inventor: Cameron Carnegie, Merritt Island, FL (US)

( * ) Notice: Subject to any disclaimer, the term of this patent is extended or adjusted under 35 U.S.C. 154(b) by 0 days.

(21) Appl. No.: 17/567,244

(22) Filed: Jan. 3, 2022

Related U.S. Application Data

(60) Provisional application No. 63/133,473, filed on Jan. 4, 2021.

(51) Int. Cl.
*B64C 39/12* (2006.01)
*B64C 11/00* (2006.01)
*B64C 21/06* (2006.01)
*B64C 1/00* (2006.01)

(52) U.S. Cl.
CPC ............ *B64C 39/12* (2013.01); *B64C 11/001* (2013.01); *B64C 21/06* (2013.01); *B64C 2001/0036* (2013.01); *B64C 2001/0045* (2013.01); *B64D 2241/00* (2013.01)

(58) Field of Classification Search
CPC .... B64C 2001/0018; B64C 2001/0036; B64C 2001/0045; B64C 1/0009; B64C 21/06; B64D 27/02; B64D 27/10; B64D 27/14; B64D 2241/00
See application file for complete search history.

(56) References Cited

U.S. PATENT DOCUMENTS

| | | | |
|---|---|---|---|
| 3,269,673 A | * | 8/1966 | Reiniger ............... B64C 31/028 |
| | | | D12/333 |
| 6,047,923 A | | 4/2000 | Lafferty |
| 6,123,295 A | * | 9/2000 | Wexler .................... B64G 1/14 |
| | | | 244/119 |
| 6,394,392 B1 | | 5/2002 | Lafferty |
| 7,200,999 B2 | | 4/2007 | Bagnall |
| 8,464,511 B1 | | 6/2013 | Ribarov |
| 9,143,023 B1 | | 9/2015 | Uskert |
| 9,212,625 B2 | | 12/2015 | Shelley |
| 9,835,093 B2 | | 12/2017 | Golshany |
| 10,177,424 B1 | | 1/2019 | Melack |
| 10,370,114 B2 | | 8/2019 | Jones |

(Continued)

FOREIGN PATENT DOCUMENTS

EP    1 167 183 A2    2/2002

OTHER PUBLICATIONS

Justus Benad, The Flying-V, "Flying long distances energy-efficiently" https://www.tudelft.nl/en/ae/flying-v/.

*Primary Examiner* — Richard R. Green
*Assistant Examiner* — William L Gmoser
(74) *Attorney, Agent, or Firm* — Stephen Bullock; Bullock Law

(57) ABSTRACT

Embodiments of the present invention are related to a Y-shaped airliner including an elongate main fuselage bifurcated into two outwardly angled fuselage extensions defined as a first fuselage extension and a second fuselage extension. The airliner includes a NACA inlet, a medial fan, a pair of forward canard wings, and a pair of side wings each including at least one engine. The medial fan is positioned between the first fuselage extension and the second fuselage extension. The NACA inlet is positioned on the main fuselage rear skin and is structured to feed airflow into the medial fan.

20 Claims, 6 Drawing Sheets

(56) References Cited

U.S. PATENT DOCUMENTS

| | | |
|---|---|---|
| 10,553,882 B2 | 2/2020 | Solte |
| 10,677,166 B2 | 6/2020 | Pesyna |
| 2014/0263831 A1* | 9/2014 | Mitchell, Jr. .......... B64D 11/00 244/1 N |
| 2015/0284067 A1* | 10/2015 | Suciu ....................... B64C 5/02 244/87 |
| 2019/0390601 A1* | 12/2019 | Casado-Montero ...... F02C 7/04 |
| 2020/0040846 A1 | 2/2020 | Lugg |

* cited by examiner

Y-SHAPED AIRLINER AND ASSOCIATED METHODS

FIELD OF THE INVENTION

The present invention relates to systems and methods for optimizing the structure and efficiency of airliners. In particular, the present invention relates to a Y-shaped airliner and associated methods.

BACKGROUND

Little has changed in airliner configurations since the 1970s. Fifty-year-old business models based on antiquated supply chain and production methodologies still pervade the industry. However, societal expectations, priorities, and global concerns have shifted a great deal since that time.

The automobile industry has highlighted a demand for transportation that is more efficient, relies less on fossil fuels, and limits carbon footprints. It also highlights the fact that shifting an industry resistant to change can be lucrative while addressing societal and environmental demand and concerns.

Because airliner designs have persisted since a time when fuel efficiency was not a concern, typical single aisle airliners may burn over twenty thousand liters of fuel in a trip and emit over 80 metric tons of carbon dioxide. Furthermore, traditional configurations limit integration of advanced revolutionary engine designs such as high BPR open fan engines. These designs only allow integration of evolutionary engine designs with small increments in fan diameter, BPR, and fuel efficiency. Such slow progress in airliner design practices and technology compounds the per capita waste that taxes the environment and sustains high travel costs and compounds price swings associated with supply and demand of fossil fuels.

Arguments against change include high risk and development costs as well as the public's possible reluctance to accept a radical new airliner because of a natural fear of flying and a distrust of altering something with a track record of safety. As such, the concern is that human psychology would naturally favor the familiar.

There exists a need in the art for an improved airliner design that can accommodate advanced ultra-high BPR engine designs with minimal penalties in risk, weight, cost, and negative public perception. This will unlock a revolutionary step improvement in fuel efficiency and environmental impact. The new design must easily integrate into existing manufacturing plants, supply chains, and business models. Therefore, there exists a need in the art for a Y-shaped airliner and associated methods.

SUMMARY OF THE INVENTION

Embodiments of the present invention are related to a Y-shaped airliner including an elongate main fuselage bifurcated into two outwardly angled fuselage extensions defined as a first fuselage extension and a second fuselage extension. The airliner includes a NACA inlet, a medial fan, a pair of forward canard wings, and a pair of side wings each including at least one engine. The medial fan is positioned between the first fuselage extension and the second fuselage extension. The NACA inlet is positioned on the main fuselage rear skin and is structured to feed airflow into the medial fan.

In this embodiment, the NACA inlet may span from a point between the first wing and second wing, continue between the fuselage extensions and extend under and around the medial fan to include a portion of the airliner rear. The NACA inlet may slope from the airliner upper surface to a lower surface and may be structured to create lift force upon the bodies of the fuselage extensions, wing roots, and main fuselage body. The NACA inlet may include a narrow entrance on the airliner upper surface, form a channel that descends to the lower surface and may include a wider exit at the airliner rear. Furthermore, the channel may be flanked by side walls that taper from the lower surface to the upper surface and the side walls may curve outward from the upper surface to the lower surface creating the narrow entrance and wider exit. Additionally, the narrow entrance may be structured to direct airflow through the channel and through the medial fan creating additional lift force upon the airliner.

Continuing with this embodiment, the NACA inlet on the airliner upper skin may be structured to capture boundary layer air and channel it through the medial fan and out the back of the airliner. Furthermore, the medial fan may be affixed to the airliner at one of a position aft the NACA inlet side walls and a position between the NACA inlet side walls.

Another embodiment of the invention may include a Y-shaped airliner including, an elongate main fuselage bifurcated into two angled fuselage extensions defined as a first fuselage extension and a second fuselage extension, a NACA inlet, a medial fan, a pair of forward canard wings, a first wing comprising at least one engine and a first wing root, and a second wing comprising at least one engine and a second wing root. In this embodiment, the first wing may attach to the main fuselage and the first fuselage extension via the first wing root. Likewise, the second wing may attach to the main fuselage and the second fuselage extension via the second wing root. The medial fan may be positioned between the first rear fuselage extension and the second rear fuselage extension. Furthermore, the NACA inlet may be positioned on the main fuselage upper rear skin and structured to feed airflow into the medial fan.

In this embodiment, the wing root of the first wing and wing root of the second wing may attach at angles conforming to the outward angles created by the main fuselage and the respective first fuselage extension and second fuselage extension. The medial fan may be positioned between the first fuselage extension and second fuselage extension, overtop the NACA inlet at a rear portion and below the NACA inlet entrance proximate the rear of the Y-shaped airliner and may be structured to insulate the remaining airliner components and surroundings from sound and potential hazards.

The pair of side wings may include an undulated feed proximate the wing root connection point with the main fuselage. The connection point of the first wing and second wing may be positioned adjacent the NACA inlet and structured to pull air over the first fuselage extension, second fuselage extension and wing root to generate lift.

In this embodiment the first fuselage extension may include an exterior vertical stabilizer and a horizontal stabilizer and the second fuselage extension may include a vertical stabilizer and a horizontal stabilizer. Furthermore, the Y-shaped airliner may further include a first side landing gear and a second side landing gear positioned on the respective first and second fuselage extensions structured to provide a wide stabilizing stance and optimized support angle for landing gear extension and retraction.

Yet another embodiment of the invention may be a Y-shaped airliner including an elongate main fuselage bifurcated into two angled fuselage extensions defined as a first rear fuselage extension and a second rear fuselage extension, a NACA inlet, a medial fan, a pair of forward canard wings, and a pair of side wings each comprising at least one engine.

In this embodiment, the medial fan may be positioned between the first rear fuselage extension and the second rear fuselage extension. The NACA inlet may be positioned on the main fuselage upper rear skin and may be structured to feed airflow into the medial fan. The medial fan may be positioned atop a rear portion of the NACA inlet and the main fuselage may include a lateral double bubble monocoque design with a frame including a concave upper surface and a convex lower surface. The concave upper surface may be structured to facilitate directing airflow on the main fuselage upper exterior and wing roots of the airliner.

In this embodiment, the lateral double bubble monocoque design may include a first side bubble and a second side bubble divided by the center support barrier. The first fuselage extension and second fuselage extension may be structured as egg-shaped lobes each comprising a frame with a broader upper arc and narrower concave bottom and hull storage below their seating. The main fuselage interior may be divided down its longitudinal medial axis by a center support barrier. Additionally, the center support barrier may divide eight-abreast seating of the main fuselage into two halves of four-abreast seating. Furthermore, the first fuselage extension and second fuselage extension each may include four-abreast seating formed by sets of two, two-column seating separated by a rear aisle.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1A:
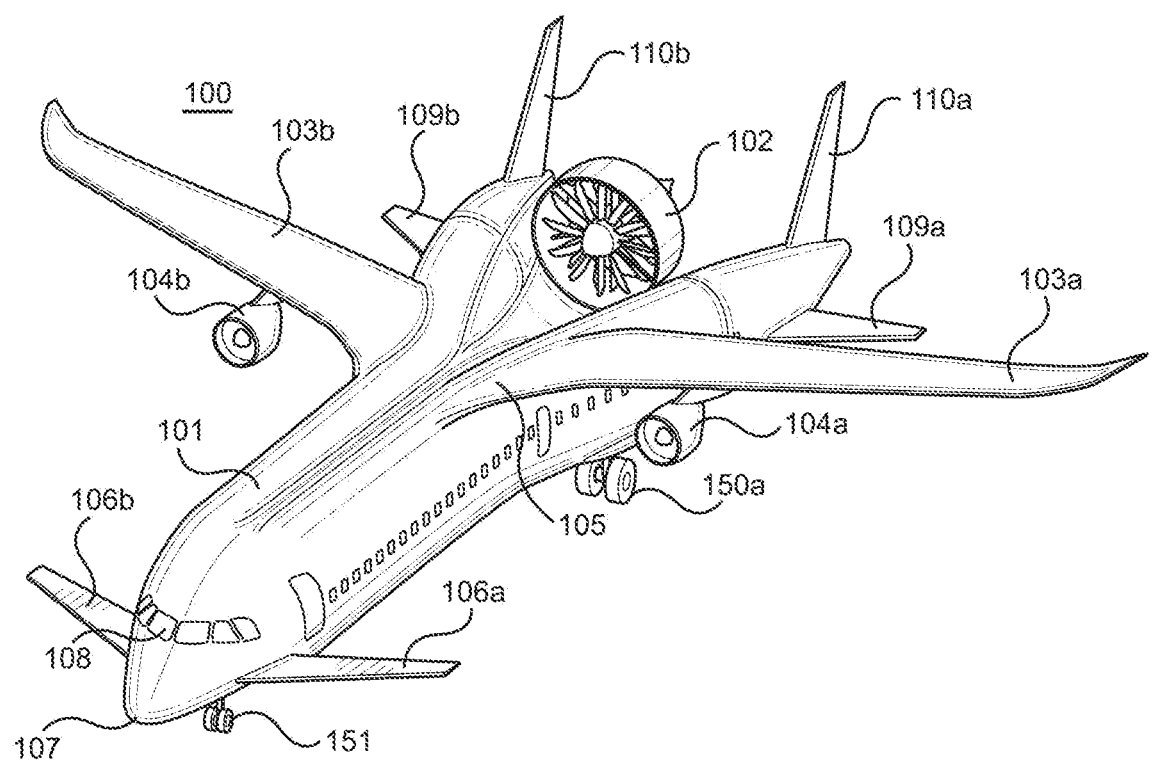
FIG. 1A is a perspective front view of a –Y-shaped airliner according to an embodiment of the invention.
Figure 1B:
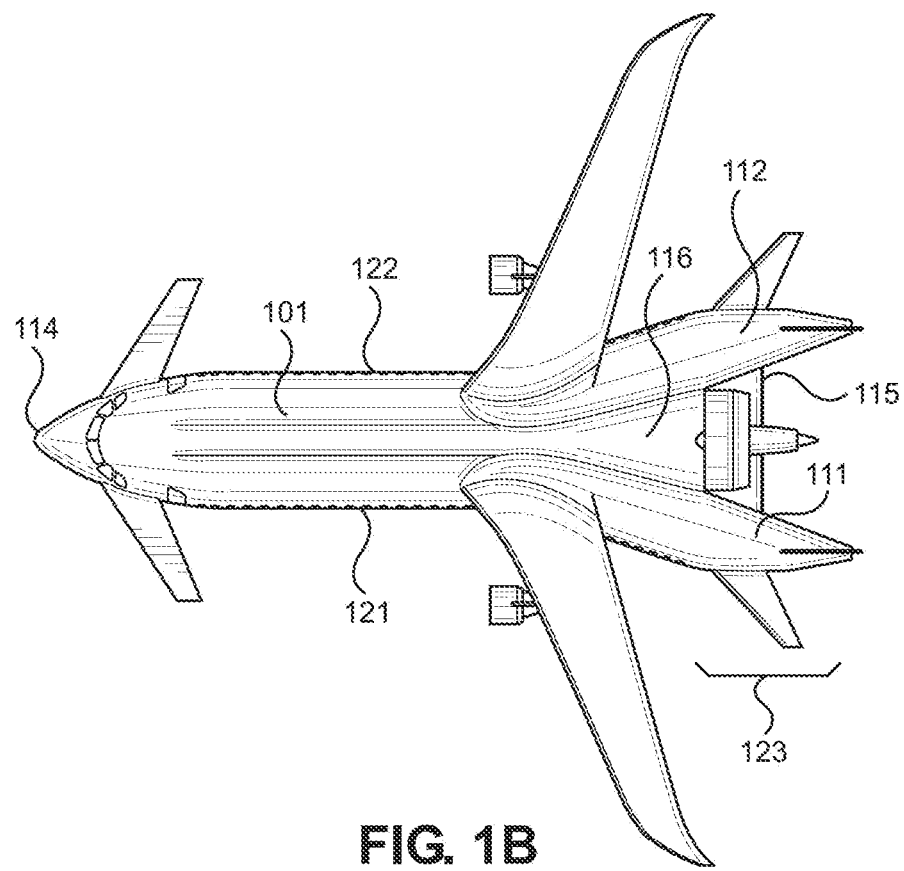
FIG. 1B is a top-down view of the Y-shaped airline illustrated in FIG. 1A.

Referring now to FIGS. 1A and 1B, a perspective front view and a top-down view of a Y-shaped airliner 100, hereinafter airliner 100, is shown. As depicted, the airliner 100 may include a main fuselage 101, a first fuselage extension 111 and a second fuselage extension 112. The combination of these fuselages 101, 111, 112 may form a Y-shaped aircraft. Therefore, the main fuselage 101 may be the elongate linear base whereas the first and second fuselage extensions 111,112 splay outward at the base aft to form what may be recognized as the upper portion of the Y. In other words, the first and second fuselage extensions 111, 112 angle distally from the first side 121 and second side 122 respectively, bifurcating the main fuselage 101 into two divergent fuselage extensions at the airliner 100 rear 115.

The airliner 100 may also include first side and second side landing gear 150a, 150b, forward landing gear 151, and a forward canard 106a, 106b proximate the nose 107 and cockpit 108 at the front 114 of the airliner 100. Additionally, the airliner 100 may include a pair of main wings 103a, 103b top mounted 105 on the main fuselage 101. Positioned below the pair of main wings 103a, 103b may be a first engine 104a and a second engine 104b. A third means of propulsion may be a medial fan 102 positioned between the first and second fuselage extensions 111, 112 at the airliner 100 rear 115.

The empennage 123 of the airliner 100 may include a first vertical stabilizer 110a and a first horizontal stabilizer 109a on the first fuselage extension 111. The first horizontal stabilizer 109a may extend distally from the first side 121 of the airliner 100. Likewise, the airliner 100 may include a second vertical stabilizer 110b and a second horizontal stabilizer 109b on the second fuselage extension 112. The second horizontal stabilizer 109a may extend distally from the second side 122 of the airliner 100. Furthermore, the airliner 100 may include a NACA inlet 116 positioned atop the main fuselage 101 between the first and second fuselage extensions 111, 112.

These figures emphasize that the airliner 100 is optimized to support a single engine cruise with two auxiliary engines for enhanced performance during takeoff and climb. The medal fan 102 may serve as a high BPR ducted cruise engine and may be sized to provide all cruise thrust. In some embodiments, the medial fan 102 may have a diameter of 13 feet. However, one skilled in the art will appreciate that the diameter of the medial fan 102 may be larger or smaller depending on need, circumstance and engineering preference. In some embodiments, the medial fan 102 may also be powered mechanically, electrically, pneumatically, or hydraulically by the first and second engines 104a, 104b.

The first and second engines 104a, 104b may be auxiliary low BPR gas turbine or electric engines positioned on the wing and sized to provide half of the required maximum takeoff thrust. They may be structured so that the thrust contribution diminishes as the airliner 100 climbs to initial cruise. In some embodiments they may provide the airliner 100 and medial fan 102 with electrical, hydraulic, pneumatic power during cruise and may serve as backup in the event of another engine failure.

Figure 1C:
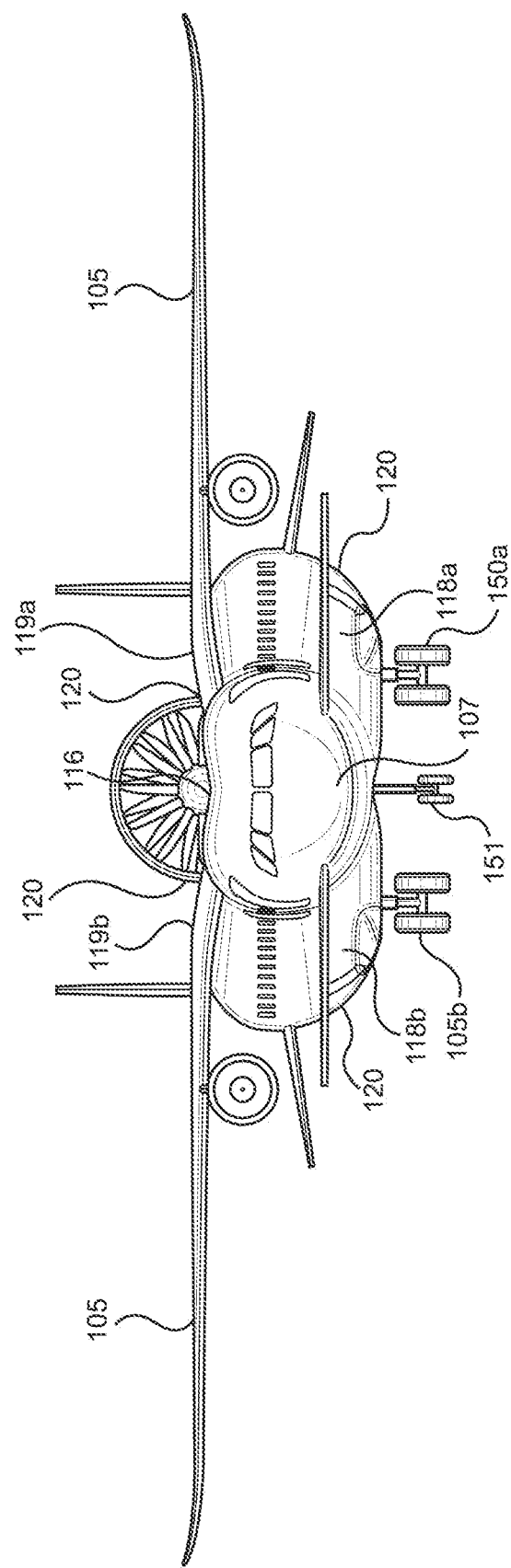
FIG. 1C is a front view of the Y-shaped airliner illustrated in FIG. 1A.
Figure 1D:
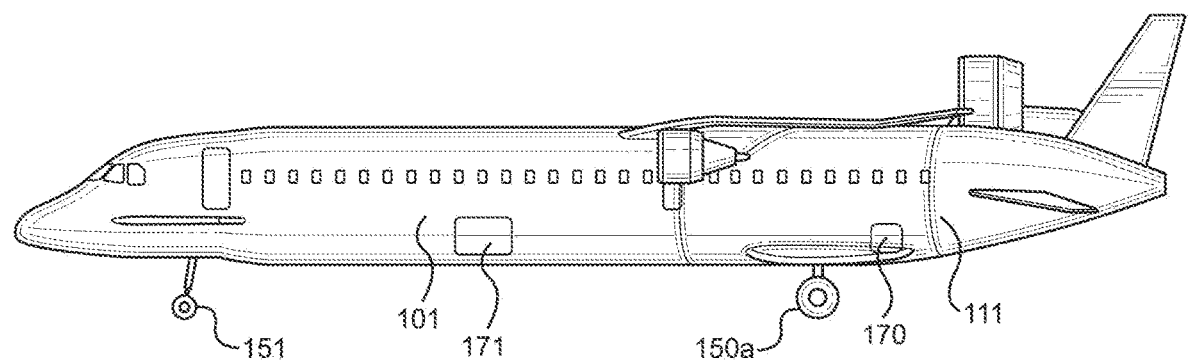
FIG. 1D is a side view of the Y-shaped airliner illustrated in FIG. 1A.

FIGS. 1C-1D further depict the coordinated design features of the airliner 100. FIG. 1C shows that the first and second sides 121, 122 angle outward from the main fuselage as a result of the first and second fuselage extensions 111, 112. This viewpoint emphasizes that both fuselage extensions 111, 112 uniformly diverge from the main fuselage 101 as outward angles 118a, 118b into two fuselage extensions 111, 112. In some embodiments, this may be recognized as a division of the main fuselage 101 into two angled halves of the main fuselage 101. In some embodiments, the outward angles 118a, 118b of the fuselage extensions 111, 112 may cause for first and second side airflow 120 to channel into the first and second engines 104a, 104b enabling them to operate more efficiently.

FIG. 1C also emphasizes that a portion of the medial fan 102 may extend above the top of the main fuselage 101 at the aft center behind the NACA inlet 116. Furthermore, each main wing 103a, 103b may be top mounted on the main fuselage 101 with an undulated feed 119a, 119b proximate the connection point with the main fuselage 101. In some embodiments this undulated feed 119a, 119b may assist with diverting airflow into the NACA inlet 116 and ultimately the medial fan 102. Furthermore, each main wing 103a, 103b may be structured so that the inboard wing gains lifting benefit from the NACA inlet 116.

FIG. 1D illustrates that the current improvements blend the main fuselage 101 with the fuselage extensions 111, 112 rather than connecting disjointed fuselages together. Among other things, this may allow for the airliner 100 to maintain the construction methods and service operations of existing airlines to facilitate its integration into modern day fleets. By maintaining, yet improving some existing concepts, the airliner 100 is well equipped to be modularized and integrated into current day production and fleets. Furthermore, because the airliner 100 maintains some aesthetic kinship with current airliners, the configuration improvements are able to be introduced to the general public with a higher likelihood of acceptance. Furthermore, the constant cross section combined with a canard or three-surface configuration may reduce the complexity of the design allowing the airliner to be stretched to larger variants, or modularized should production need arise. This is because the main fuselage 100 remains constant between the main wings 103a, 103b and canard 106a, 106b. For production purposes, the airliner 100 may be bifurcated at a single point on the main fuselage 100 so that extra frames may be added to lengthen it and increase passenger capacity. Also shown is a main fuselage cargo door 171 and a fuselage extension cargo door 170.

Figure 1E:
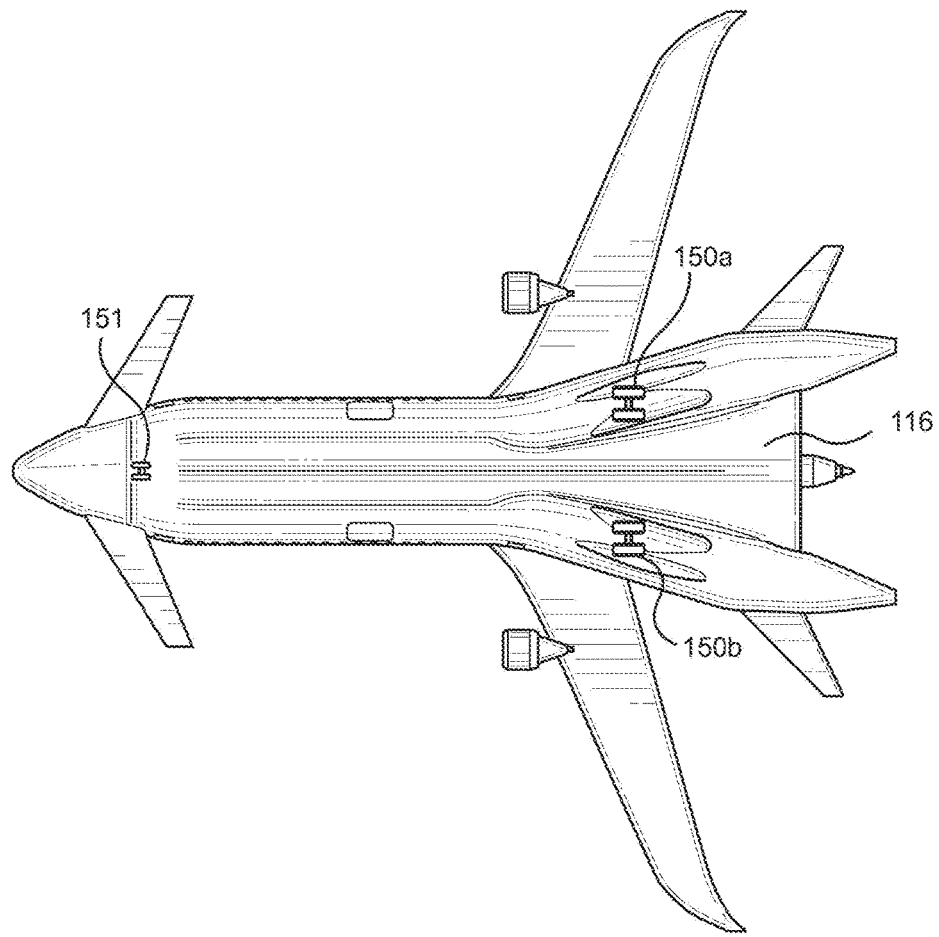
FIG. 1E is a bottom view of the Y-shaped airliner illustrated in FIG. 1A.

FIG. 1E illustrates the underside of the airliner 100 emphasizing the landing gear configuration. As shown, the first side landing gear 150a and second side landing gear 150b may be positioned on the first and second fuselage extensions 111, 112 respectively. A third landing gear 151 may be positioned proximate the front of the airliner 100. Therefore, the first and second fuselage extensions 111, 112 each may store their respective first and second side landing gear 150a, 150b. As a result, the first side and second side landing gear 150a, 150b with single trunnion and dual truck, may retract upward and back into the first and second fuselage extensions 111, 112.

The Y-shape of the airliner 100 with first and second side landing gear 150a, 150b naturally creates a stabilizing stance allowing for a simpler retraction mechanism. In this embodiment, the retraction mechanism may swing down on a simple hinge without a side brace. Therefore, the structure of the Y-shaped airliner 100 obviates the need for a more complex and convoluted landing gear assembly found in traditional airliners.

Tradition airliners stow the main landing gear within the main fuselage 101 requiring the complexity of a lateral hinge and side brace mechanism. This requires a convoluted and angled stance for stability. By including first and second side landing gear 150a, 150b on the airliner 100, the configuration allows for a much shorter and lighter landing gear trunnion. It also allows for takeoff rotation angles equivalent or better than traditional airliners with less componentry and optimized support angles.

Figure 2:
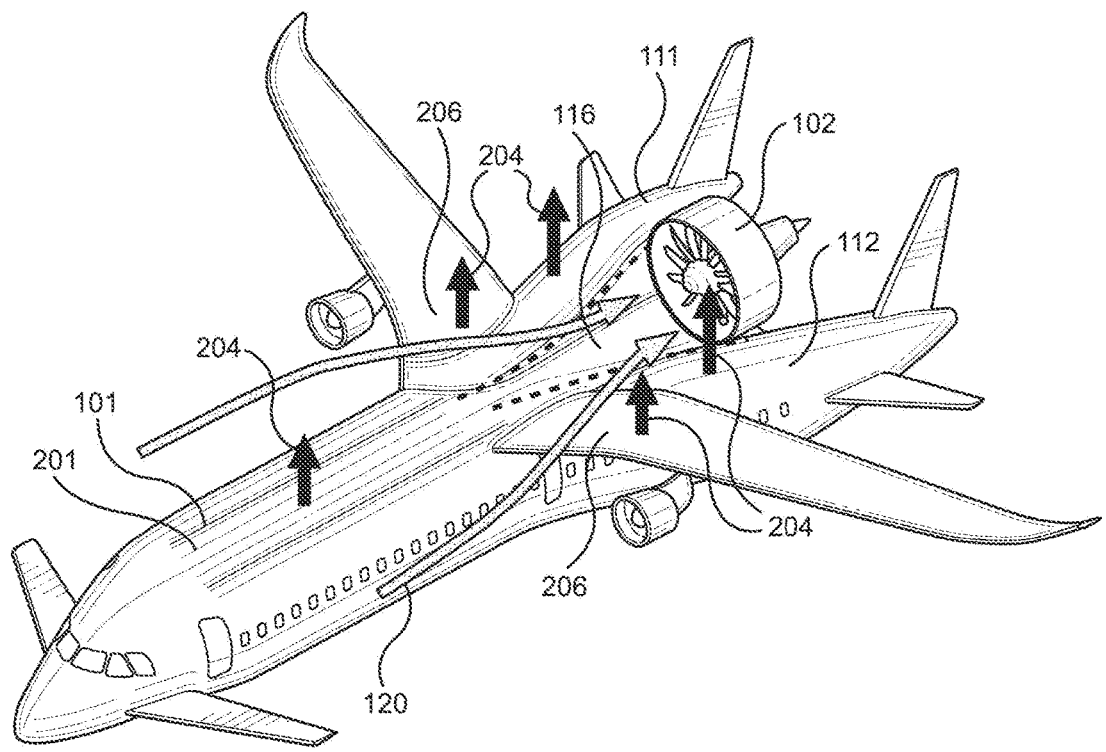
FIG. 2 is a side perspective aerodynamics view of the Y-shaped airliner illustrated in FIG. 1A.
Figure 3:
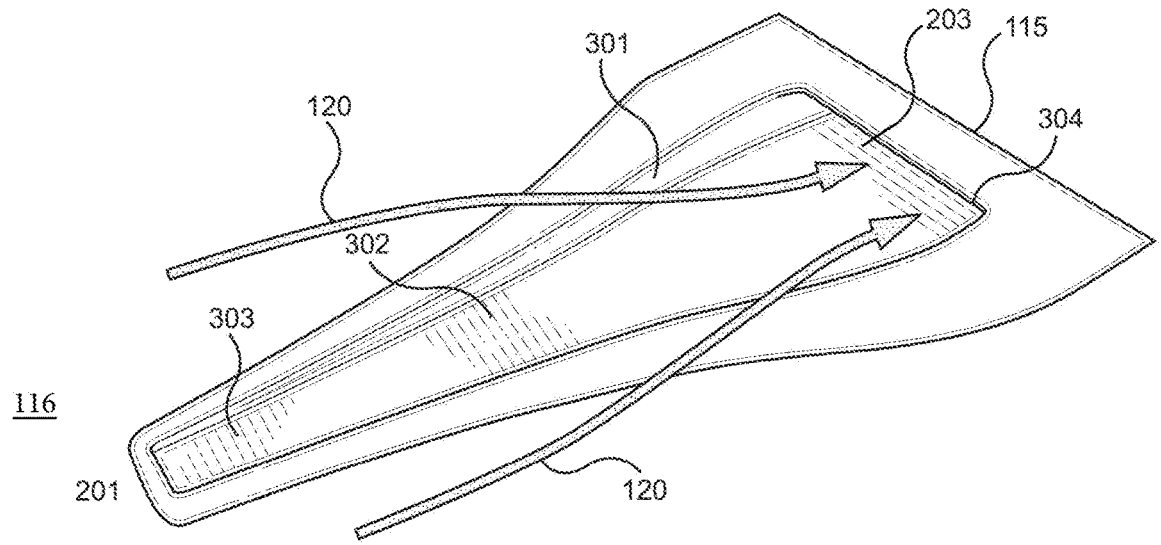
FIG. 3 is a perspective view of a NACA inlet that is integrated into the top portion of the Y-shaped airliner illustrated in FIG. 1A.

FIGS. 2-3 illustrate a key feature of the airliner 100 improvement. As shown, the upper surface 201 of the main fuselage 101 may include a NACA inlet 116. The NACA inlet 116 may span from a point between the main wings 103a, 103b, continue between the fuselage extensions 111, 112, extend under and around the medial fan 102 and encompass a portion of the rear 115 of the airliner 100. The NACA inlet 116 may cause for directed airflow 120 to be channeled across the upper longitudinal surface of the airliner 100 and through the medial fan 102. Because the NACA inlet 116 slopes from the upper surface 201 to a lower surface 203 of the airliner 100, lift force 204 may be created at certain segments allowing for more efficient performance of the airliner 100. As shown, the NACA inlet 116 may cause the bodies of the extended fuselages 111, 112, wing roots 206, and body of the main fuselage 101 to be acted upon by lift force 204.

Referring additionally to FIGS. 1B and 1E, structural safety features of the airliner 100 including the NACA inlet 116 and positioning of the medial fan 102 can be noticed. The medial fan 102 may be centrally located between the first fuselage extension 111 and the second fuselage extension 112 as well as between the first and second vertical stabilizers 110a, 110b. Because the NACA inlet 116 is positioned below the medial fan 102 and extends from the first to the second fuselage extension 111, 112 the NACA inlet 116 and fuselage extensions 111, 112 serve as sound barriers buffering noise created by the medial fan 102. Noise created by the medial fan 102 may be blocked laterally reducing airport community noise during takeoff. Furthermore, the NACA inlet 116, because it is elevated in front of the medial fan 102 may block fan noise in front of the airliner. Because the NACA inlet 116 extends below the medial fan 102, the NAGA inlet may block downward noise reducing the noise impact on the surrounding airport community during takeoff and climb to cruise.

The positioning of the medial fan 102 between the first and the second fuselage extensions 111, 112 as well overtop the NAGA inlet 116 further provides a protective insulation should the fan realize blade failure or a thrown blade. A thrown blade may cause considerable damage to any of the fuselages and other aircraft components. In this manner, the airliner 100 is structured to protectively isolate the passengers, engines, flight controls, and critical aircraft components.

Referring specifically to FIG. 3, the NACA inlet 116 may have a narrow entrance 303 on the upper surface 201 of the airliner 100. The narrow entrance 303 may begin a channel 302 that descends to the lower surface 203 to form a wider exit 304 at the rear 115. The channel 302 may be flanked by side walls 301 that may taper from the lower surface 203 to the upper surface 201. Furthermore, the side walls 301 may curve outward from the upper surface 201 to the lower surface 203 thereby creating the narrow entrance 303 and the wider exit 304. In some embodiments, the wider exit 304 may allow room for a medial fan 102 to fit between the side walls 301. In other embodiments, the medial fan 102 may be attached to the airliner 100 aft the sidewalls 301. In any embodiment, directed airflow 120 may be routed from the narrow entrance 303 through the channel 302 and ultimately through the medial fan 102. This directed airflow 120 through the channel 302 may create additional lift force 204 upon the airliner 100 and may allow for more efficient operation of the medial fan 102 and the airliner 100 as a whole.

Figure 4:
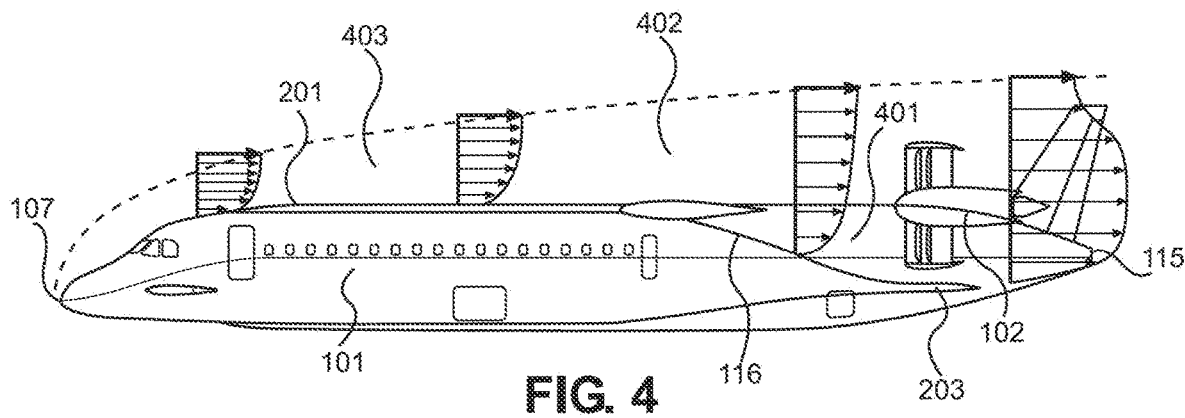
FIG. 4 is a side aerodynamics view of the Y-shaped airliner illustrated in FIG. 1A.

FIG. 4 illustrates that as the airliner passes through the air, it imparts energy to the air that closely surrounds the airliner 100 creating a boundary layer 403, 402. The boundary layer 403, 402 represents a body of accelerated air that can be used by the medial fan 102 to push against and enhance the propulsion efficiency of the airliner 100.

The NACA inlet 116 and placement of the medial fan 102 cause for boundary layer ingestion 401, which would otherwise be lost energy. As shown, the boundary layer 403 of air passing over the airliner 100 begins at the nose 107. The boundary layer 403 becomes thicker 402 longitudinally along the upper surface 201 as it moves toward the rear 115. The NACA inlet 116 captures some of the boundary layer 403 that would otherwise be lost and passes it through the medial fan 102.

As known in the art, form drag is caused by the bulk of an aircraft forcing the air around and causing the air to converge in the rear 115. This is because total drag is the combination of induced drag and parasite drag. Parasite drag is the combination of form drag, interference drag, and skin friction drag.

When an aircraft is in flight, fore and aft pressure difference are created that oppose motion, also known as drag. Combined with skin friction drag, momentum and energy are imparted to the surrounding air creating a wake of accelerated air. Some of this loss of momentum and energy are recaptured and minimized by the placement of the medial fan 102 at the center aft. Furthermore, in some embodiments, the main fuselage 101 may be shaped with additional tapers to enhance laminar flow runs and reduce turbulent boundary layers 403. This is in addition to the reduction of the aft fuselage wake and boundary layer 403 by the medial fan 102, which causes a negative or weak positive pressure gradient on the aft body reducing the pressure difference that drives form drag.

Figure 5:
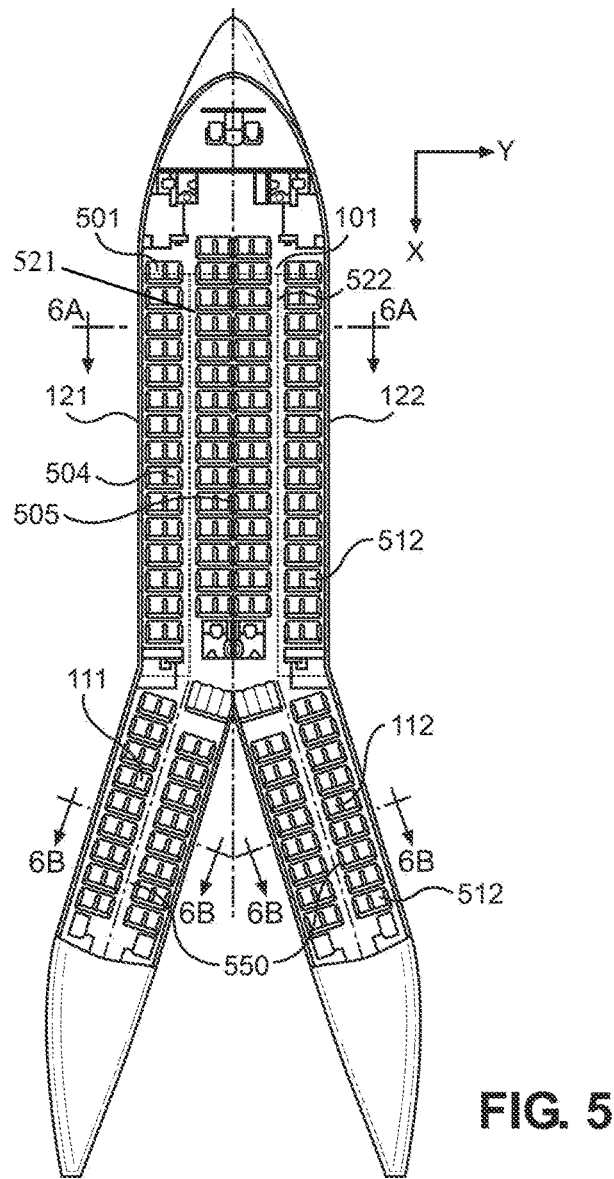
FIG. 5 is a top-down LOPA (Lay Out of Passenger Accommodations) view of the main fuselage and fuselage extensions of the Y-shaped airliner illustrated in FIG. 1A.

FIG. 5 demonstrates some of the interior advantages of the airliner 100. As shown, the airliner 100 may include a total of eight-abreast seating 501 within the main fuselage 101. The main fuselage 101 may be divided down the longitudinal medial axis by a center support barrier 505. This center support barrier 505 may also divide the eight-abreast seating 501 of the entire main fuselage 101 into two halves of four-abreast seating 504. Each four-abreast seating 504 may be formed by sets of two, two-column seating 512 separated by a first side center aisle 521 on one side of the main fuselage 101 and a second side center aisle 522 on the other side of the main fuselage 101.

This figure further emphasizes that the body of the airliner 100 is a "Y" shape with the fuselage extensions 111, 112 forming an open-scissor type formation at the aft. The figure also highlights that the body of the airliner 100 is a single, monolithic unit. Furthermore, in some embodiments, the airliner 100 may be sized to accommodate 120 passengers in the main fuselage 101 and 34 passengers in each fuselage extension 111, 112. However, one skilled in the art will appreciate that this arrangement may be more or less depending on need, structural requirements and preference. Furthermore, the airliner 100 may include two type-A doors on the first and second sides 121, 122 proximate the front of the main fuselage 101, and two type-C doors on either side 121, 122 proximate the rear of the main fuselage 101 just before the fuselage extensions 111, 112. Two type B doors may be at the rear of each fuselage extensions 111, 112. One skilled in the art will understand that the door types may be arranged differently depending on need and preference.

Each fuselage extension 111, 112 may include four-abreast seating 504 formed by sets of two, two-column seating 512. Each two-column seating 512 may be separated by a rear aisle 550.

Figure 6B:
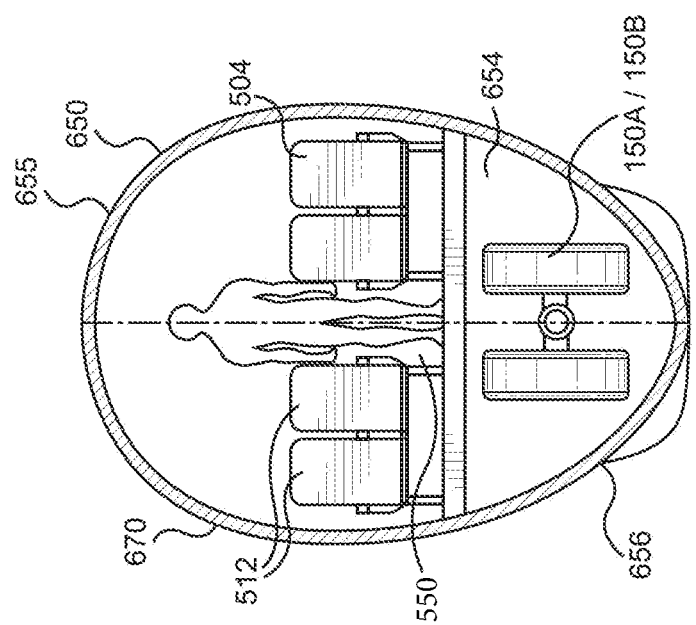
FIG. 6B is a cross sectional view of a fuselage extension taken through dissecting line 6B-B of FIG. 5.
Figure 6A:
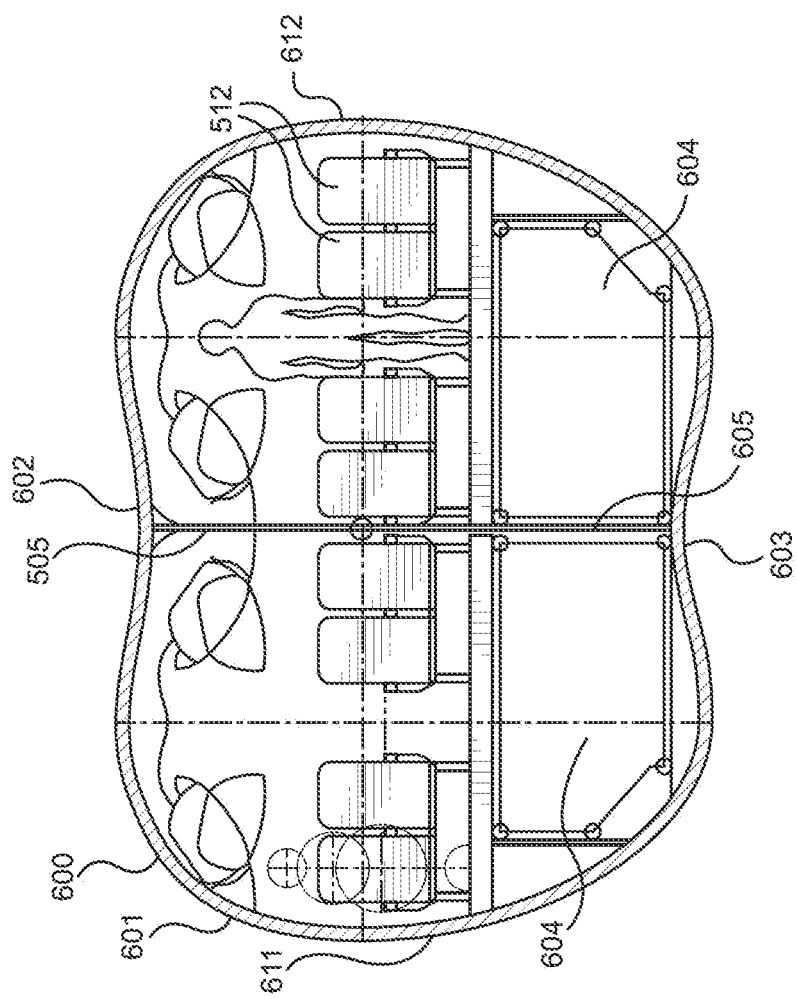
FIG. 6A is a cross sectional view of the main fuselage taken through dissecting line 6A-A of FIG. 5.

FIG. 6A is a dissected view of the main fuselage 101 as taken through line 6A-A of FIG. 5. As shown, the main fuselage 101 may consist of a lateral double bubble monocoque design 600 including a frame 601 with a concave upper surface 602 and a convex lower surface 603. In some embodiments, the concave upper surface 602 may assist with directing airflow on the upper surface of the airliner 100 as previously described.

The lateral double bubble monocoque design 600 may include a first side bubble 611 and a second side bubble 612 divided by the center support barrier 505. The hull of the main fuselage may include hull storage 604 separated by medial tension rods 605. In some embodiments, the medial tension rods 605 may be an extension of the center support barrier extending from the interior top of the airliner 100 to the interior bottom of the airliner 100.

FIG. 6B is a dissected view of a fuselage extension 111, 112 as taken through line 6B-B of FIG. 5. As shown, the fuselage extensions 111, 112 may consist of an egg-shaped lobe 650 with hull storage 654 below the seating. The fuselage extensions 111, 112 may include a frame 670 with a broader upper arc 655 and narrower concave bottom 656. Also featured is a side landing gear 150a, 150b indicating the ease by which it may be stowed within the hull storage 654 of the fuselage extension 111, 112.

That which is claimed is:

1. A Y-shaped airliner comprising
    an elongate main fuselage bifurcated into two outwardly angled fuselage extensions defined as a first fuselage extension and a second fuselage extension;
    a NACA inlet;
    a medial fan;
    a pair of forward canard wings; and
    a pair of side wings each comprising at least one engine;
    wherein the medial fan is positioned between the first fuselage extension and the second fuselage extension; and
    wherein the NACA inlet is positioned on the main fuselage rear skin, extends from the first fuselage extension to the second fuselage extension, and is configured to feed airflow into the medial fan.

2. The Y-shaped airliner of claim 1 wherein the NACA inlet spans from a point between the first wing and second wing, continues between the fuselage extensions and extends under and around the medial fan to comprise a portion of the airliner rear.

3. The Y-shaped airliner of claim 1 wherein the NACA inlet slopes from the airliner upper surface to a lower surface and is configured to create lift force upon the bodies of the fuselage extensions, wing roots, and main fuselage body.

4. The Y-shaped airliner of claim 1 wherein the NACA inlet comprises a narrow entrance on the airliner upper surface, forms a channel that descends to the lower surface, and comprises a wider exit at the airliner rear.

5. The Y-shaped airliner of claim 4 wherein the channel is flanked by side walls that taper from the lower surface to the upper surface; and wherein the side walls curve outward from the upper surface to the lower surface creating the narrow entrance and wider exit.

6. The Y-shaped airliner of claim 4 wherein the narrow entrance is configured to direct airflow through the channel and through the medial fan creating additional lift force upon the airliner.

7. The Y-shaped airliner of claim 1 wherein the NACA inlet on the airliner upper skin is configured to capture boundary layer air and channel it through the medial fan and out the back of the airliner.

8. The Y-shaped airliner of claim 1 wherein the medial fan is configured to be affixed to the airliner at one of a position aft the NACA inlet side walls and a position between the NACA inlet side walls.

9. A Y-shaped airliner comprising an elongate main fuselage bifurcated into two angled fuselage extensions defined as a first fuselage extension and a second fuselage extension;
a NACA inlet;
a medial fan;
a pair of forward canard wings; and
a first wing comprising at least one engine and a first wing root;
a second wing comprising at least one engine and a second wing root;
wherein the first wing attaches to the main fuselage and the first fuselage extension via the first wing root;
wherein the second wing attaches to the main fuselage and the second fuselage extension via the second wing root;
wherein the medial fan is positioned between the first rear fuselage extension and the second rear fuselage extension;
wherein the NACA inlet is positioned on the main fuselage upper rear skin, extends from the first fuselage extension to the second fuselage extension, and is configured to feed airflow into the medial fan.

10. The Y-shaped airliner of claim 9 wherein the wing root of the first wing and wing root of the second wing attach at angles conforming to the outward angles created by the main fuselage and the respective first fuselage extension and second fuselage extension.

11. The Y-shaped airliner of claim 9 wherein the medial fan is positioned between the first fuselage extension and second fuselage extension, overtop the NACA inlet at a rear portion and below the NACA inlet entrance proximate the rear of the Y-shaped airliner and is configured to insulate the remaining airliner components and surroundings from sound and potential hazards.

12. The Y-shaped airliner of claim 9 wherein the pair of side wings comprise an undulated feed proximate the wing root connection point with the main fuselage.

13. The Y-shaped airliner of claim 9 wherein the connection point of the first wing and second wing is positioned adjacent the NACA inlet and configured to pull air over the first fuselage extension, second fuselage extension and wing root to generate lift.

14. The Y-shaped airliner of claim 9 wherein the first fuselage extension comprises an exterior vertical stabilizer and a horizontal stabilizer; and wherein the second fuselage extension comprises a vertical stabilizer and a horizontal stabilizer.

15. The Y-shaped airliner of claim 9 wherein the Y-shaped airliner further includes a first side landing gear and a second side landing gear positioned on the respective first and second fuselage extensions configured to provide a wide stabilizing stance and optimized support angle for landing gear extension and retraction.

16. A Y-shaped airliner comprising an elongate main fuselage bifurcated into two angled fuselage extensions defined as a first rear fuselage extension and a second rear fuselage extension;
a NACA inlet;
a medial fan;
a pair of forward canard wings; and
a pair of side wings each comprising at least one engine;
wherein the medial fan is positioned between the first rear fuselage extension and the second rear fuselage extension;
wherein the NACA inlet is positioned on the main fuselage upper rear skin, extends from the first fuselage extension to the second fuselage extension, and is configured to feed airflow into the medial fan;
wherein the medial fan is positioned atop a rear portion of the NACA inlet;
wherein the main fuselage comprises a lateral double bubble monocoque design including a frame with a concave upper surface and a convex lower surface; and
wherein the concave upper surface is configured to facilitate directing airflow on the main fuselage upper exterior and wing roots of the airliner.

17. The Y-shaped airliner of claim 16 wherein the lateral double bubble monocoque design includes a first side bubble and a second side bubble divided by the center support barrier.

18. The Y-shaped airliner of claim 16 wherein the first fuselage extension and second fuselage extension are configured as egg-shaped lobes each comprising a frame with a broader upper arc and narrower concave bottom and hull storage below their seating.

19. The Y-shaped airliner of claim 16 wherein the main fuselage interior may be divided down its longitudinal medial axis by a center support barrier; and wherein the center support barrier divides eight-abreast seating of the main fuselage into two halves of four-abreast seating.

20. The Y-shaped airliner of claim 16 wherein the first fuselage extension and second fuselage extension each include four-abreast seating formed by sets of two, two-column seating separated by a rear aisle.

* * * * *